Figure 1:
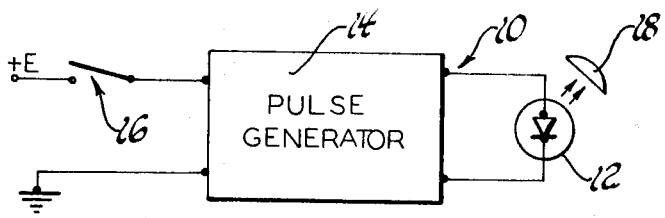

United States Patent

[11] 3,605,082

[72] Inventor David R. Matthews
Ann Arbor, Mich.
[21] Appl. No. 816,727
[22] Filed Apr. 16, 1969
[45] Patented Sept. 14, 1971
[73] Assignee Laser Systems Corporation
Ann Arbor, Mich.

[54] INTRUDER DETECTION SYSTEM
20 Claims, 6 Drawing Figs.
[52] U.S. Cl. ................................. 340/258,
250/221, 307/233
[51] Int. Cl. ................................. G08b 13/18
[50] Field of Search ........................ 340/258,
258 B, 228 S; 250/206, 215, 221, 222; 307/233,
234; 328/111

[56] References Cited
UNITED STATES PATENTS

| | | | |
|---|---|---|---|
| 2,339,750 | 1/1944 | Bartholy | 340/258 B UX |
| 2,783,459 | 2/1957 | Lienau et al. | 340/258 |
| 3,076,897 | 2/1963 | Skirvin | 340/258 B UX |
| 3,284,719 | 11/1966 | Kahn | 307/233 X |
| 3,299,295 | 1/1967 | Goda | 307/233 X |
| 3,370,284 | 2/1968 | Bagno | 340/258 |
| 3,444,544 | 5/1969 | Pearson et al. | 340/258 |
| 3,460,000 | 8/1969 | Kiffmeyer | 307/233 |
| 3,509,359 | 4/1970 | Embling | 340/258 |

Primary Examiner—John W. Caldwell
Assistant Examiner—Perry Palan
Attorney—Barnard, McGlynn $ Reising ABSTRACT: An intruder detection system of the type employing a transmitter for producing a continuous train of radiant energy pulses and a receiver which is spaced from the transmitter and in the line of sight thereof to define a monitored area. The receiver controls an alarm device in such a fashion that the alarm device remains inactive as long as pulses continue to be received but which becomes active if the pulse train is interrupted either by means of an intruder in the line of sight or by an attempt to defeat the system with a continuous radiant energy source focused on the receiver.

INVENTOR.
David R. Matthews
BY
Barnard, McGlynn & Reising
ATTORNEYS

INVENTOR.
David R. Matthews
BY
Barnard, McGlynn & Reising
ATTORNEYS

INTRUDER DETECTION SYSTEM

This invention relates to intruder detection systems of the type employing a transmitter producing a continuous train of signal pulses and a receiver which operates an alarm device if the transmission of pulses from the transmitter to the receiver is interrupted.

In accordance with the invention, the presence of an intruding person or object in an area defined by the line of sight between a signal transmitter and receiver is positively detected. This is accomplished by transmitting a continuous train of pulses at a given rate toward the receiver to maintain an alarm device in a deactivated condition as long as pulses are received at the given rate. However, when the pulses transmission is interrupted for a predetermined time, the absence of received pulses causes the transmitter to assume an output condition which activates the alarm device.

The intruder detection system of the subject invention is immune to attempts to defeat the intruder detection function by focusing a continuous signal source on the receiver. This is accomplished by constructing the receiver to be responsive only to time varying signals, i.e. pulses, and unresponsive to steady state input signals.

In accordance with the invention, a receiver amplifier is effectively rendered responsive only to input signals of rapidly varying character, i.e. pulses of short duration, to transmit such signals to a trigger stage for control of the alarm device. In general, this is accomplished through the use of amplifiers having negative feedback circuits which vary the gain of the amplifier as between time varying and steady state input signal waveforms; the amplifier gain being substantially high for the short duration input signal pulses.

In a preferred form, the invention employs a trigger stage which is maintained in a first output condition as long as pulses are received from the transmitter but which assumes a second output condition to activate an alarm device if no pulses are received within a predetermined time period. In general, this is accomplished by means for producing a control signal which is related to the time between input signals and threshold detecting trigger means responsive to control signals in excess of a predetermined level to assume an output condition suitable for actuation of an alarm device.

In the preferred form of the invention, the threshold-detecting trigger means include bias means which maintains the receiver sensitivity to time between input pulses constant irrespective of substantial variations in supply voltage. In general, this is accomplished by bias means associated with a threshold-detecting trigger transistor for varying the input bias on the transistor in the same proportions that the control signal varies due to supply voltage variations.

In a specific form, the invention provides sharp signal response and high signal to noise ratios. In general, this is accomplished by employing pulses of narrow waveform and by selecting a receiver bandwidth at a center frequency which provides good signal response and minimizes noise components.

The invention is preferably embodied in an infrared radiant-energy type transmission and receiving system employing semiconductor diodes in the transmitter and receiver circuits.

Figure 3:
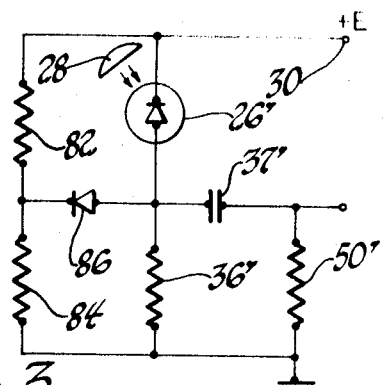
Figure 2:
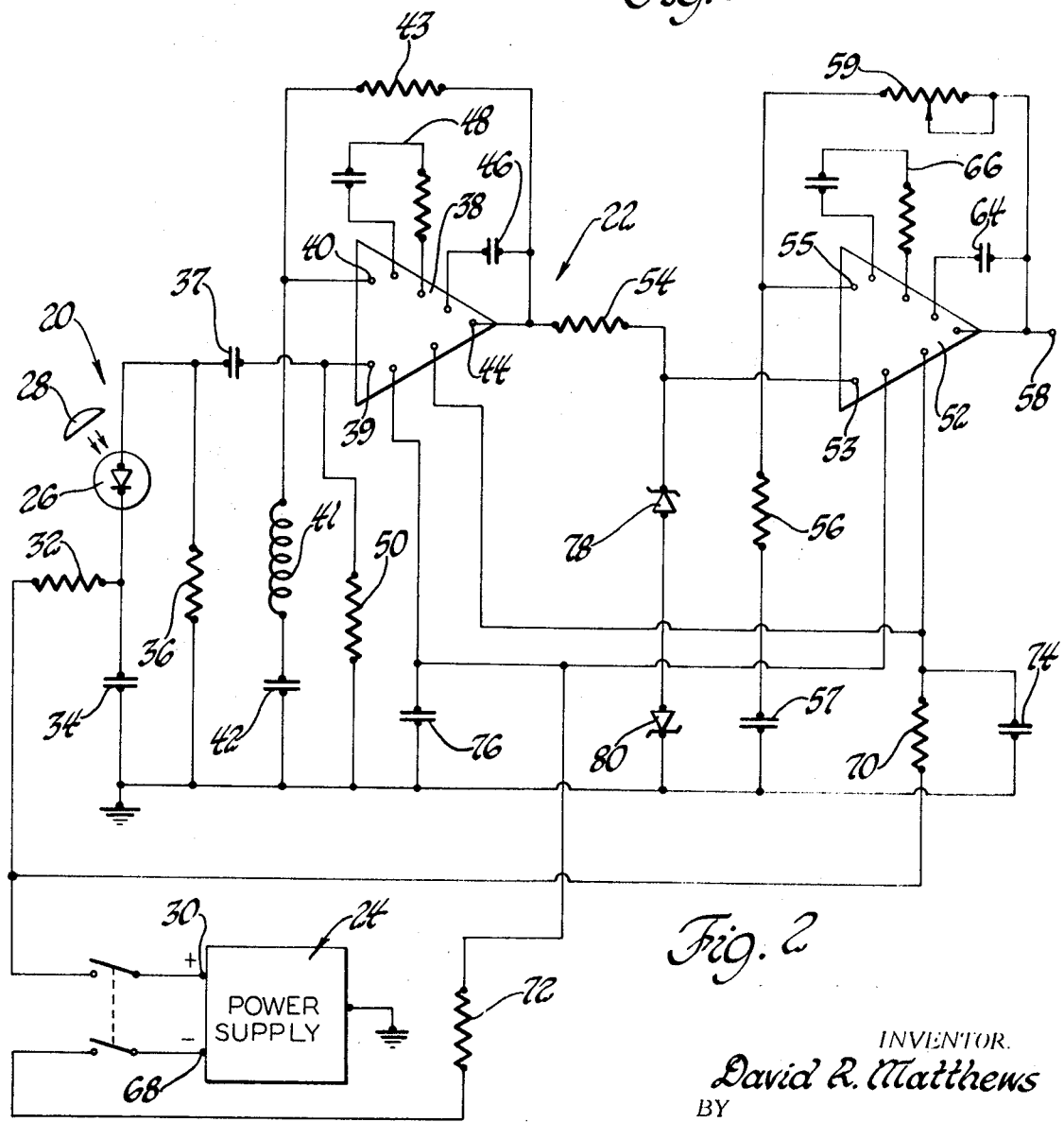
Figure 4:
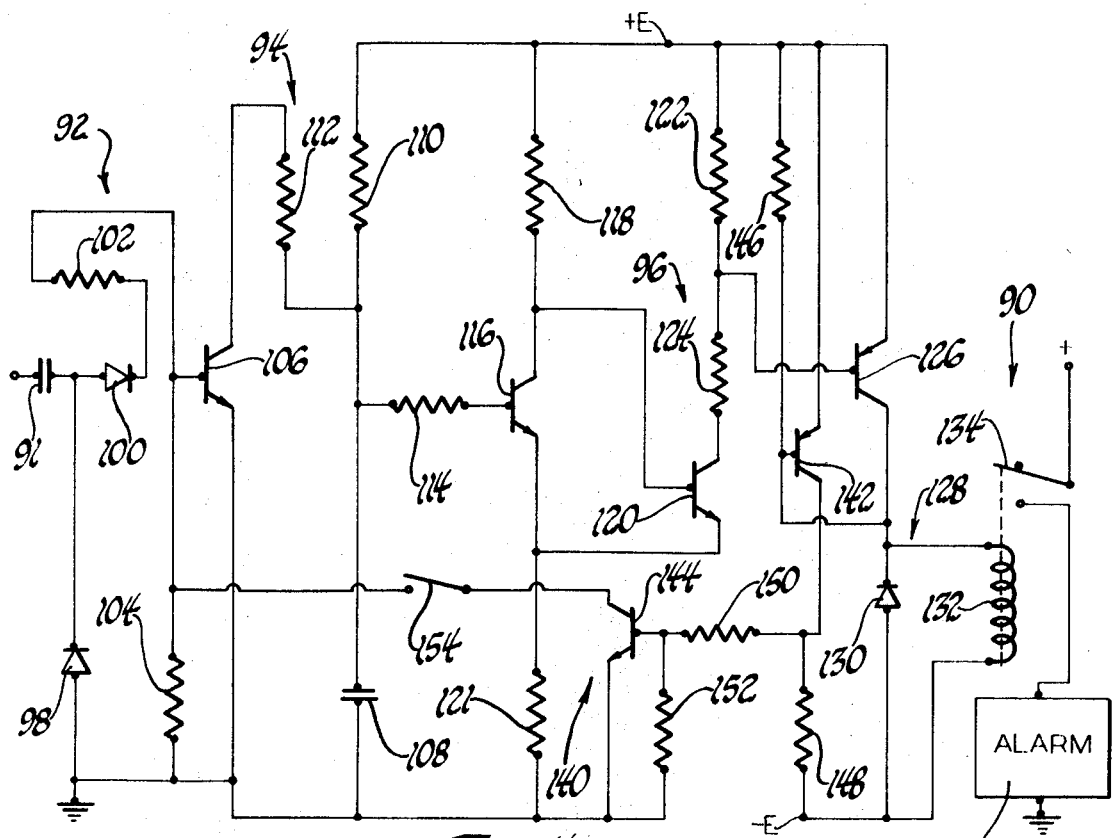
Figure 5:
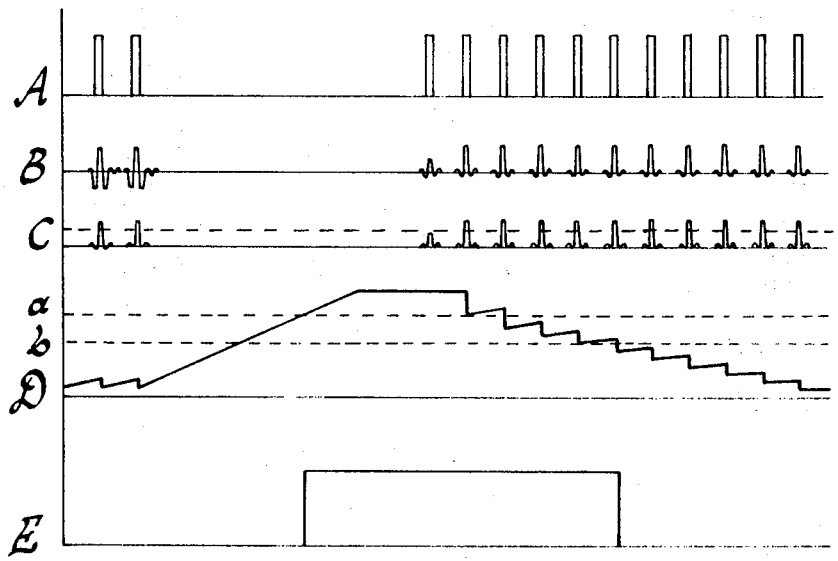
Figure 6:
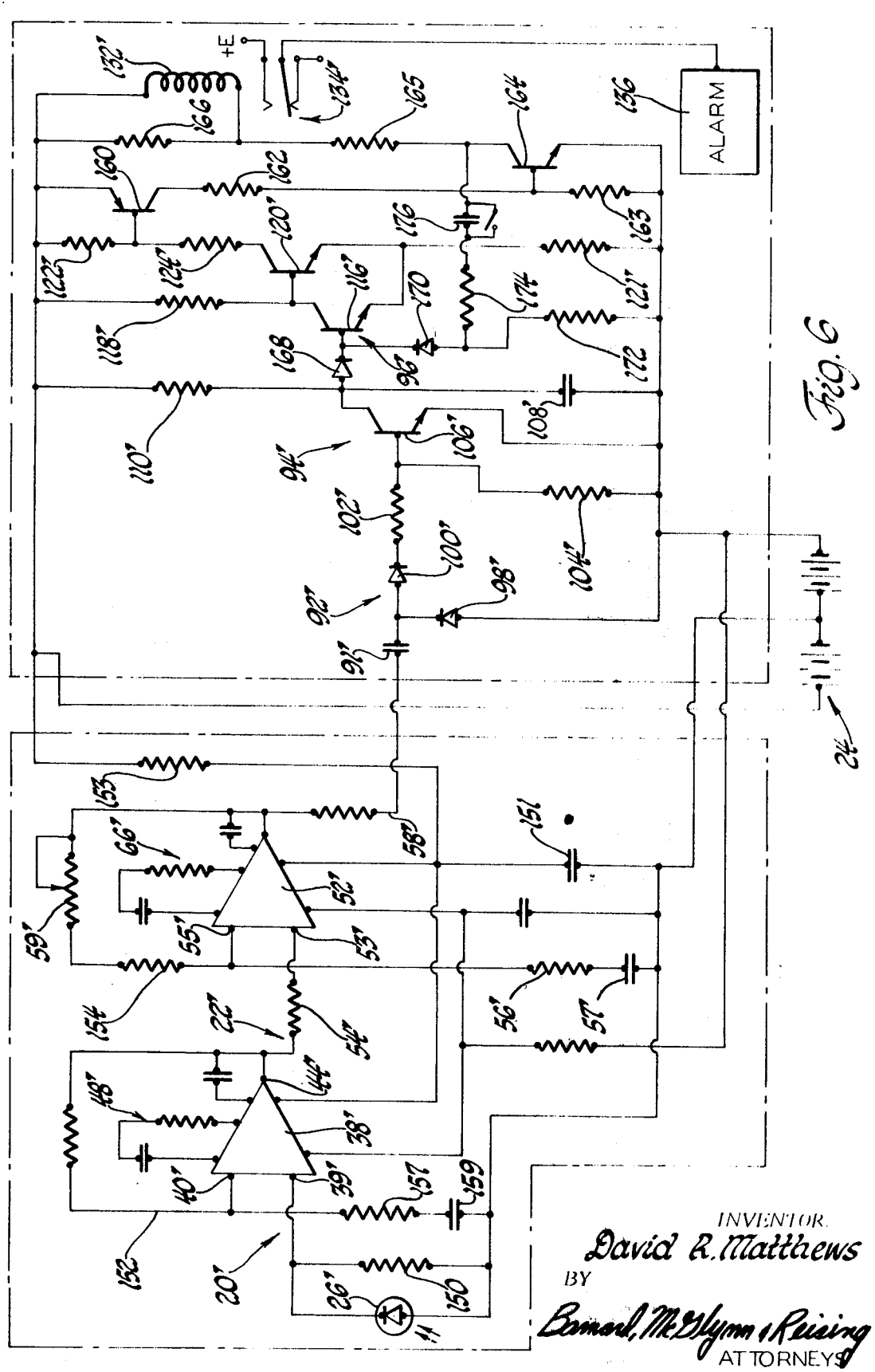

The invention may be best understood by reference to the following description of a specific embodiment to the invention which is to be taken with the accompanying drawings of which;

FIG. 1 is a block diagram of a transmitter,

FIG. 2 is a circuit diagram partly in schematic detail of a detector and amplifier circuit, FIG. 3 is a schematic diagram of a modified portion of the FIG. 2 detector circuit, FIG. 4 is a schematic diagram of a preferred trigger circuit, FIG. 5 is a chart of signal waveforms employed in describing the operation of the embodiment of FIGS. 1 through 4; and FIG. 6 is a schematic circuit diagram of an alternative embodiment of the invention.

FIG. 1 shows a transmitter 10 for producing a continuous series of radiant energy pulses at a predetermined rate. Transmitter 10 includes a radiant energy emitting semiconductor diode 12 which is supplied with current pulses by a pulse generator 14 such as a multivibrator or a relaxation oscillator. Pulse generator 14 is connected to a DC voltage source +E by means of a switch 16. Diode 12 may be of a commercially available gallium arsenide type having an output in the 9,000 Angstrom unit range. Operating the diode 12 in a pulsed mode permits the application of relatively high current pulses to produce high power output. For example, diode 12 may be operated with 300 microsecond pulses at 400 milliamps and a rate of 200 pulses per second. A high energy output beam from diode 12 is provided by means of a lens 18 which can be used to provide a narrow and highly defined line of sight. Such concentrated pulses of infrared energy are highly effective in outdoor applications as they are easily detected under all atmospheric and weather conditions.

As shown in FIG. 2, the radiant energy pulse train from transmitter 10 is directed toward a receiver having a detector stage 20, an amplifier stage 22, and a power supply 24. Detector stage 20 produces receiver pulses in response to the signals from transmitter 10 as long as no person or object lies in the line of sight between the transmitter and receiver. The pulses are amplified in amplifier stage 22 and applied to the circuit of FIG. 4.

FIG. 4 includes a clamping circuit 92 for clamping the amplified signals at a predetermined level and a control signal generator 94 for producing a control signal related in amplitude to the time between the incoming receiver pulses. FIG. 4 further includes a threshold-detecting trigger circuit 96 which monitors the control signal and assumes an output condition related to the amplitude thereof to control an alarm device 90. If the time period between the incoming receiver pulses exceeds a set value, the control signal rises above a predetermined level and the trigger circuit 96 assumes an output condition which activates alarm device 90 to produce an alarm signal.

Describing FIG. 2 in greater detail detector stage 20 includes a silicon diode 26 for receiving and detecting the radiant energy pulses from emitting diode 12 through a lens 28. The peak response of the diode 26 is preferably chosen to correspond to the wavelength of diode 12. A suitable infrared transmitting filter may be placed in front of lens 28 to filter out ambient light. Diode 26 varies in resistance in accordance with the intensity of radiant energy focused thereon and accordingly is connected in circuit with power supply 24 to produce receiver voltage pulses. The positive terminal 30 of power supply 24 is connected through a resistor 32 to the cathode of diode 26 and to ground through a capacitor 34. A large resistor 36 is connected between the anode of diode 26 and ground to form a load circuit which is shunted by capacitor 34. Accordingly, upon condition of diode 26 the largest portion of the voltage from power supply terminal 30 occurs across resistor 36.

The voltage pulse formed across resistor 36 is applied through a coupling capacitor 37 to first input 39 of an operational amplifier 38. A second input 40 of amplifier 38 is connected to ground through a tuned circuit including inductor 41 and capacitor 42, which defines the center frequency of the amplifier response. For gain control purposes a feedback resistor 43 is connected between amplifier output 44 and the input 40. The series connected combination of resistor 43, inductor 41, and capacitor 42 forms a resonant circuit which operates to vary the gain of amplifier 38 in a predetermined relation to the time varying character of the signal amplified thereby; i.e., for steady state input signals, the gain of amplifier 38 is approximately unity whereas for rapidly varying input signals the amplifier gain is several thousand. In a pulse receiver system as illustrated, a pulse width of 300 microseconds produces minimum negative feedback and maximum amplifier gain. Operational amplifier 38 also includes feedback capacitor 46, and RC feedback loop 48 to define the high frequency rolloff of the amplifier response and a grounded input load resistor 50.

Output 44 of amplifier 38 is connected to a first input 53 of a second operational amplifier 52 by resistor 54. The second input 55 is connected to ground through the series combination of resistor 56 and capacitor 57 and also to output 58 through an adjustable feedback resistor 59. The presence of capacitor 57 also serves to render the gain of amplifier 52 dependent on input signal waveform as was the case for amplifier 38. Minor feedback control loops for amplifier 52 include capacitor 64 and RC loop 66, the loop 66 defining the high frequency amplifier rolloff characteristic.

Positive supply voltage is connected to amplifiers 38 and 52 from the positive terminal 30 of power supply 24 through resistor 70 as shown. Similarly, a negative supply voltage is furnished from terminal 68 through resistor 72. Capacitive filtering is provided between the positive and negative supply terminals of amplifiers 38 and 52 by means of capacitors 74 and 76, respectively. In addition, back-to-back voltage-limiting Zener diodes 78 and 80 are connected between the input 53 of amplifier 52 and ground to prevent an overload on amplifier 52 arising out of an excessive signal from amplifier 38.

FIG. 3 illustrates an alternative form of the detector stage 20 shown in FIG. 2. In FIG. 3 the light-responsive diode 26' has the cathode thereof connected to the positive terminal 30 of the power supply 24 as shown and the anode connected through capacitor 37' to the input of operational amplifier 38 and through the large resistor 36' to ground in a fashion similar to that illustrated in FIG. 2. The resistor 50' is also connected in shunt relationship with the diode 26' and resistor 36', respectively. A voltage-responsive blocking diode 86 is connected between the junction of resistors 82 and 84 and the anode of diode 26' such that when the voltage across resistor 36' reaches a predetermined value, the load for diode 26' is switched from the large resistor 36' to the comparatively small resistor 82 thereby to reduce the signal applied to the input of amplifier 38 by a factor which is proportional to the ratio between resistors 36' and 82. This ratio may be on the order of 1,000:1.

Referring now to FIG. 4, the clamp 92, the control signal generator 94, the trigger circuit 96 and the alarm device 90 will be described in detail. A coupling capacitor 91 is connected from the output 58 of operational amplifier 52 to the base electrode of an NPN transistor 106 through a diode 100 and a resistor 102. The clamp portion 92 further includes diode 98 having the cathode connected to the anode of diode 100 and the anode connected to ground. A bias resistor 104 is connected across the base-emitter junction of transistor 106. On the occurrence of a positive signal across resistor 104, transistor 106 is rendered conductive but is otherwise normally cut off. The control signal generator 94 further includes a capacitor 108 having one electrode connected to a positive voltage supply source through a resistor 110 an the other electrode connected to ground as shown. Capacitor 108 is, therefore, continuously charged by the voltage source through resistor 110. However, when the transistor 106 is rendered conductive, the charge accumulated on capacitor 108 is discharged through a resistor 112 and the collector and emitter circuit of transistor 106. Accordingly, the accumulated charge on capacitor 108 is a function of the time between the application of positive pulses to transistor 106, and the receipt of pulses at the rate of operation of pulse generator 14 in the transmitter 10 continuously maintains the total accumulated charge on capacitor 108 below a predetermined first level. However, in the absence of such pulses for a predetermined time, determined by the time constant of the combination of resistor 110 and capacitor 108, the charge on capacitor 108 exceeds this predetermined first level.

The positive voltage electrode of capacitor 108 is connected through a resistor 114 to the base electrode of an NPN-type threshold detecting trigger transistor 116 which forms part of the trigger stage 96. The collector electrode of transistor 116 is connected through a resistor 118 to the positive voltage source and the emitter is connected through a resistor 121 to ground. Transistor 116 is normally nonconducting but is rendered conducting by the accumulation of sufficient charge on capacitor 108. Trigger portion 96 includes an amplifying transistor 120 of NPN type and having the base electrode connected to the collector electrode of transistor 116, the emitter electrode connected commonly with the emitter of transistor 116 and the collector electrode connected through a pair of resistors 122 and 124 to the positive supply source. Trigger portion 96 further includes an output stage including a PNP-type transistor 126 the conductivity state of which defines the output condition of trigger stage 96. The base electrode of transistor 126 is connected to the junction between resistors 122 and 124, the emitter is connected to a relay control circuit 128. Circuit 128 includes a relay coil 132 and a parallel connected diode 130 to provide a path for induced current through coil 132 when transistor 126 cuts off. Coil 132 operates the alarm device 90 by controlling the condition of a switch 134 which is connected between a separate voltage source and the alarm signal generator 136.

As indicated, transistors 116 and 120 are NPN types and, therefore, are forward biased by a positive voltage across the base-emitter junction. On the other hand, transistor 126 is of the PNP type and, therefore, is reverse biased by a positive voltage across the base emitter junction. Accordingly, when the charge across capacitor 108 exceeds the predetermined first level, a forward bias is applied to transistor 116 which thereupon becomes conductive. This applies a larger portion of the supply voltage across resistor 118 and decreases the forward bias on transistor 120 which, accordingly, turns off. This raises the bias applied to the base of transistor 126 which accordingly turns that transistor off. Whenever transistor 126 s turned off, the current through relay coil 132 is terminated and switch 134 closes to direct current through the alarm-producing generator 136 to indicate the presence of an intruder in the line of sight between transmitter 10 and the receiver diode 26.

With transistor 120 turned off, little or no current flows from the supply source through the path defined by the series combination of resistors 122 and 124, transistor 120, and resistor 121. Rather, a current flow to ground through resistor 121 is directed through resistor 118 and transistor 116. Resistor 118 is chosen to be substantially large than the combination of resistors 122 and 124 and, accordingly, a smaller portion of the voltage drop between the supply source and ground occurs across resistor 121. Therefore, the bias supplied to the emitter electrode of transistor 116, once the transistor has been turned on, is decreased and the transistor will remain on until the charge on capacitor 108 decreases to a second value which is lower than the first predetermined threshold value which turned the transistor 116 on. Accordingly, the detector circuit 88 will maintain the alarm device 90 in the actuated condition for a predetermined time period even though amplified pulses may be received by the transistor 106 to begin discharging capacitor 108.

The interconnection between transistors 120 and 116 also operates to render the trigger circuit 96 relatively insensitive to supply voltage variations which might otherwise affect the time required to reach the threshold value of transistor 116. The bias on the emitter of transistor 116 is determined by the combination of resistors 122, 124, 121, and the normally conductive transistor 120. The combination of resistors is effectively a voltage divider presenting an emitter bias on transistor 116 which is proportional to the supply voltage. Similarly, the charging rate of capacitor 108 is related to the supply voltage. Therefore, the emitter bias on transistor 116 is automatically adjusted for variations in supply voltage to hold the turn on threshold for transistor 116 at a substantially fixed percentage of supply voltage irrespective of the absolute supply voltage value. Transistor 116, thus, turns on after a fixed number of missing transmitter pulses even through the supply voltage may vary over a wide range.

FIG. 4 also includes a selectively operable latch circuit 140 for maintaining the alarm device 136 on once it has been activated. Circuit 140 includes a PNP-type transistor 142 having the base electrode connected through a resistor 146 to the positive voltage supply, and also to the collector electrode of transistor 126. The collector electrode of transistor 142 is connected to a resistor 148 to a negative power supply terminal as indicated and also through a resistor 150 to the base or input electrode of an NPN-type transistor 144. The base electrode of transistor 144 is connected to ground through a resistor 152 to produce the initial bias condition for the transistor. Similarly, emitter electrode is connected directly to ground as shown. The collector electrode of transistor 144 is connected through a manually operable switch 154 to the input or base electrode of transistor 106.

When transistor 126 is turned off to produce the alarm signal, the voltage decrease on the collector electrode of transistor 126 is communicated to the base electrode of transistor 142 to turn that transistor on. This produces a voltage rise at the base of transistor 144 which turns that transistor on to effectively short circuit the input of transistor 106. Accordingly, further pulses from the amplifier of FIG. 3 will not reach the input or base electrode of transistor 106 but will be short circuited through transistor 144 to ground. Capacitor 108 will continue to charge thus maintaining trigger detector transistor 116 in the conductive condition which, as previously described, maintains the alarm device 136 on. Opening switch 154 obviously defeats the latch circuit 140.

A summary of the operation of the embodiment of FIGS. 1 through 4 will now be made with reference to the waveforms of FIG. 5.

Switch 16 is closed to initiate operation of transmitter pulse generator 14. Current pulses at 200 c.p.s. are directed through emitting diode 12 causing the emission of infrared radiant energy pulses. The pulses are collimated by lens 18 into a narrow beam which if focused on receiver leans 28. As long as the line of sight between transmitter diode 18 and receiver diode 26 is clear of obstructions, detector stage 20 produces voltage pulses at the input 39 of amplifier 38 which correspond in frequency and waveform to the pulse generator output which drives diode 12. These pulses, which are represented by line A of FIG. 5, are amplified by amplifiers 38 and 52 to assume the form of line B, clamped by diodes 98 and 100 and applied to the base electrode of transistor 106 in the form illustrated by line C of FIG. 5. It will be observed that the amplifiers 38 and 52 produce a slight ringing effect on the output waveform which corresponds to the resonant frequency of the feedback means to maximize amplifier gain. Neither pulses of rounded waveform nor steady state input signals produce this resonance and thus produce only low amplifier gain.

Capacitor 108 receives charging current at a substantially constant rate through resistor 110. However, each highly amplified pulse from amplifier output 58 renders transistor 106 momentarily conductive discharging capacitor 108 through resistor 112. The voltage waveform across capacitor 108 as represented on line D, remains well below level $a$ which indicated by a broken line in FIG. 5.

Should the line of sight between transmitter diode 12 and receiver diode 26 be obstructed by an intruding person or object, pulse reception by the receiver diode is interrupted as indicated by the loss of pulses in FIG. 5. Capacitor 108 continues to charge at a predetermined rate until the voltage amplitude exceeds level $a$ of line D, FIG. 5. At this level, transistor 116 is biased conductive, transistor 120 is turned off, and output transistor 126 is turned off. The loss of current through coil 132 allows relay controlled switch 134 to close energizing alarm signal generator 136 with current of the waveform shown on line E.

Should the intruder remain in the receiver line of sight, the alarm signal will continue. However, the intruder will ordinarily move on allowing pulse transmission to be resumed. The receipt of pulses begins to turn transistor 106 on to incrementally discharge capacitor 108 which has charged to nearly the full value of the supply source. After receipt of two pulses, the charge is reduced below level $a$, but the trigger transistor 116 continues to conduct due to the change in emitter bias caused by the direction of current through resistor 118 rather than resistors 122 and 124. Accordingly, transistor 116 remains forward biased until the capacitor charge is reduced below level $b$ of line D, FIG. 5. This may be set to require five or more pulses as indicated. When the capacitor charge decreases to level $b$, transistor 116 cuts off allowing transistors 120 and 126 to conduct, opening relay switch 134 and terminating the alarm signal.

Should it be desirable to maintain the alarm signal indefinitely, latch switch 154 may be closed. In this condition, the termination of current through coil 132 which turns the alarm on renders transistors 142 and 144 conductive to present an effective short circuit to the input of transistor 106. Accordingly, the resumption of pulses does not affect transistor 106 and capacitor 108 continues to charge to the supply voltage, holding transistor 116 conductive and maintaining the alarm signal.

Should an attempt be made to defeat the system by focusing a bright infrared source on diode 26, a steady state signal is presented to amplifiers 38 and 52. Reactive feedback paths, including capacitors 42 and 57, drastically reduce the amplifier gain so that only a small signal is provided on output 58. This signal is of insufficient amplitude to forward bias transistor 106 and accordingly, the charge on capacitor 108 rapidly exceeds threshold level $a$ to sound the alarm by way of trigger transistor 116.

In the initial setting of the system, diode 26 is matched to the transmitting diode 12 so that the optical wavelength of the transmitted pulses corresponds to the maximum sensitivity frequency of diode 26. In addition, the detector load resistor 36 is selected such that leakage current from sunlight and heat causes approximately 80 percent of the supply voltage to appear across resistor 36, the remaining 20 percent appearing across diode 26. This permits the detector 20 to function under worst-case conditions but renders the detector sensitive to a bright infrared source to operate the amplifier section 22.

The gain of amplifiers 38 and 52 may be adjusted to be compatible with the sensitivity adjustments of detector stage 20 by illuminating the detector diode 26 with an unmodulated infrared source to produce what will be regarded as a maximum noise signal. Amplifier gain is then increased until the noise operates the receiver as if a signal were being received. The gain is then reduced approximately 20 percent. At this setting, the receiver is not responsive to noise but will cause an alarm signal if an attempt is made to defeat the system by focusing a bright unmodulated infrared source on diode 26.

Feedback circuit capacitors 42 and 57 are selected to produce maximum negative feedback for DC inputs to amplifiers 38 and 52 and minimum negative feedback for rapidly varying inputs. The band-pass of amplifier 38 is determined by the tuned including inductor 41 and capacitor 42. The low frequency roll off for amplifier 52 is determined by resistor 56 and capacitor 57. Additional roll off on the high frequency side of the band-pass is provided by tuned circuits 48 and 66 in amplifiers 38 and 52, respectively. The selection of the frequency response characteristics of amplifier section 22 is made on the basis of signal to noise ratios and the optimum performance of transmitter diode 12. As previously stated, diode 12 is preferably excited with narrow pulses of current to produce peak power output. However, the narrower the pulses become, the wider the amplifier bandwidth must become to pass an acceptable portion of the receiver signal. Moreover, the amplifier noise increases with increasing bandwidth and, therefore, an optimum relationship between transmitter signal pulse width, amplifier center frequency and amplifier bandwidth must be selected. In the system of FIG. 2, using a transmitter pulse width of 300 microseconds, a receiver center frequency of 1,700 cycles per second and a bandwidth of 800 cycles per second has been found to pass approximately 70 percent of the detected signal while substantially limiting the amplifier $1/f$ noise and local line voltage fundamental and second harmonic noise components. By increasing pulse width up to one half of the amplifier center frequency period, an increased signal component portion can be obtained but only at the expense of a transmitter diode of increased capacity. Accordingly, the preferred implementation of the invention employs a narrow pulse amplifier with a center frequency determined by pulse width rather than a sine wave signal and an amplifier center frequency determined by repetition rate.

Referring now to FIG. 6, an alternative embodiment of the receiver circuit is shown which is particularly suitable to miniaturized systems. In FIG. 6, diode 26' of detector stage 20' is connected to an amplifier stage 22' the output of which is connected to clamp stage 92', signal producing stage 94' and threshold-detecting trigger stage 96'. Detector stage 20' includes a load resistor 150 connected across diode 26', the parallel combination being connected on one side to a positive terminal of power supply 24 through capacitor 151 and resistor 153 and on the other side to an input 39' of operational amplifier 38'. The output 44' of amplifier 38' is connected through a resistor 54' to input 53' of operational amplifier 52' having an output 58'. A negative feedback resistor 152 is connected between the output 44' and the input 40' of amplifier 38' for gain control. The input frequency bandwidth is determined by the resistor 157 and capacitor 159 connected in series between input 40' and the supply voltage. Similarly, feedback resistors 59' and 154 are connected between output 58' and input 55' of amplifier 52', and a band-pass circuit including resistor 56' and capacitor 57' is connected between input 55' and the supply voltage. High frequency rolloff is provided by feedback circuits 48' and 66'. The operation of detector stage 20' and amplifier stage 22' is similar to that of stages 20 and 22 of FIG. 2 and will not be reexplained in detail. The circuit of FIG. 6 is best suited to operation on narrower input signal pulses than those received by the circuit of FIG. 2.

Output 58' of amplifier 52' is connected to the base of transistor 106' through coupling capacitor 91' and clamp stage 92' which includes diodes 98' and 100' and resistor 102'. The rectified and clamped pulses intermittently turn transistor 106' on to discharge a capacitor 108' which receives charging current from source 24 through resistor 110'. If the charge on capacitor 108' exceeds threshold level as previously described with reference to FIG. 5, a forward bias is applied to transistor 116'. In the conductive state, transistor 116' draws current from source 24 through resistor 118' decreasing the forward bias applied to the base of transistor 120'. As transistor 120' cuts off, the current is no longer directed through collector resistors 122' and 124', thus providing a reverse bias on the base of transistor 160. Turning off the flow of current through transistor 160 and the collector resistors 162 and 163 produces a reverse bias condition at the base of transistor 164 tending to cut off the flow of current through that transistor. s transistor 164 cuts off, current can no longer flow through the parallel combination of resistor 166 and relay coil 132' and the series resistor 165. Accordingly, relay coil 132 permits relay switch 134' to close directing current through an alarm signal producer 136.

The circuit of FIG. 6 includes means for maintaining the alarm device 136 in the energized condition for a predetermined period even though the transmitted signal pulses may be interrupted for a much briefer period. This means includes a capacitor 176, a resistor 174 and a diode 170 connected inbetween the collector of transistor 164 and the base of transistor 116', and a resistor 172 connected between the resistor 174 and the negative supply voltage. In addition, a diode 168 is connected between the base of transistor 116' and the collector of transistor 106'. Whenever transistor 164 cuts off to energize alarm 136, the supply voltage charges capacitor 176 through resistors 172 and 174 at a rate determined by the RC time constant of the circuit. This applies a forward bias to the base of transistor 40 holding that transistors in the conductive condition for a sufficient time to permit various instrumentalities to respond to the alarm signal from device 136.

Turning transistor 120' off prevents current flow resistors 122' and 124' and places supply voltage across the series combination of resistor 118', transistor 116' and resistor 121'. Resistor 118' is selected to be larger than the combined total of resistors 122' and 124' such that with current flowing through resistor 118', the emitter voltage on transistor 116' is reduced, thus maintaining the transistor on until the charge on capacitor 108' is reduced to value lower than that which originally caused transistor 116' to conduct.

The circuit of FIG. 6 preferably operates on transmitter pulses of narrower width than those received by the circuit of FIG. 2. For example, at 150 pulses per section, a pulse width of 50 microseconds may be employed. The bandwidth of amplifier stage 22' must be accordingly larger than that of amplifier stage 22 of FIG. 2. A good signal to noise ratio in the amplifier portion 22' can be obtained at a center frequency of 6 KC and a bandwidth of 10 KC.

The invention has been described in an illustrative manner, and it is to be understood that the terminology which has been used is intended to be in the nature of woods of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the present invention in which an exclusive property or privilege is claimed are defined as follows:

1. A security system comprising: a transmitter for emitting a continuous series of signal pulses of short duration along a predetermined line of sight, a receiver spaced from the transmitter along the line of sight and including detector means responsive to the signal pulses to produce corresponding receiver pulses, first signal responsive means connected to receive the receiver pulses for producing an output signal which varies in amplitude according to the time varying amplitude quality of the receiver pulses whereby receiver pulses of a relatively highly time varying amplitude produce a first output signal level and receiver pulses of relatively slow time varying amplitude produce a second output signal level, second signal responsive means connected to receive the outputs of the first signal responsive means and including means for producing a signal quantity which varies in amplitude progressively from a reference value according to time, means for resetting the signal quantity to the reference value only upon occurrence of an output of at least a predetermined level, and alarm means for producing an alarm signal when the signal quantity varies beyond a predetermined amplitude due to the inordinate time delay in the receipt of an output of at least said predetermined level.

2. A security system as defined in claim 1 wherein the first signal responsive means is an amplifier having an input and an output and having a variable gain characteristic which is related to the time varying amplitude quality of signals applied to the input.

3. A security system as defined in claim 2 including tuned feedback means connected between the output and the input of the amplifier to produce a high amplifier gain only for input signals of high time varying amplitude quality.

4. A security system as defined in claim 2 including means for maintaining the alarm signal for a predetermined time interval.

5. A security system as defined in claim 1 wherein the means for producing the signal quantity includes a voltage source, a capacitor connected to be charged by the source and a transistor connected to discharge the capacitor in response to receipt of outputs from the first signal responsive means.

6. A security system as defined in claim 5 wherein the second signal responsive means includes a transistor having an input electrode connected to the capacitor whereby the charge in the capacitor controls the conductivity of the transistor.

7. A security system as defined in claim 6 including latch means responsive to energization of the alarm means to maintain the transistor nonconductive irrespective of the receipt of pulses from the detector means.

8. A security system as defined in claim 1 wherein the signal pulses are of infrared radiant energy, and the detector means comprises a semiconductor diode responsive to the infrared radiant energy to produce a variable electrical resistivity, a power supply, and circuit means for connecting the diode to the power supply for producing the receiver pulses.

9. A security system as defined in claim 8 including means for adjusting the sensitivity of the detector means to signals of various amplitudes.

10. A security system comprising: a transmitter for emitting a continuous series of signal pulses of short duration at a predetermined rate, a receiver spaced from the transmitter for receiving the radiant energy pulses and including detector means arranged to intercept the signal pulses and to produce receiver signals in response thereto, means for varying the sensitivity of the detector means to variations in pulse signal amplitude, amplifier means connected to the detector means for producing an amplified output only in response to the short duration receiver signals, trigger means connected to the amplifier means output and responsive to signals at a first rate to assume a first output condition and responsive to the absence of signals for a predetermined period to assume a second output condition, and alarm means operatively connected to the trigger means for producing an alarm signal when the trigger means assumes the second output condition.

11. A security system as defined in claim 10 wherein the amplifier means includes at least one operational amplifier having a negative feedback circuit for producing a unity gain in response to relatively steady state signals and a high gain in response to relatively short duration signals.

12. A security system as defined in claim 10 wherein the trigger means includes output means for establishing the first and second output conditions, first means for producing a control signal having an amplitude related to the rate of occurrence of the amplified detector signal, and means connected to the output means for establishing the second output condition when the control signal amplitude reaches a predetermined level.

13. A security system as defined in claim 12 wherein the trigger means includes means for maintaining the output means in the second output condition for a predetermined time.

14. A security system as defined in claim 12 wherein the alarm means includes a voltage source, a relay coil connected to be energized by the output means when in the first output condition, an alarm signal producing device, and a relay switch having a normally closed condition but being opened by energization of the coil, said source, switch and device being connected in series such that the coil is deenergized when the output means assumes the second output condition.

15. A security system as defined in claim 12 including selectively operable latching means for maintaining the alarm means in an activated condition after the detector means once assumes the second output condition.

16. In a security system, receiver means responsive to radiant energy signal pulses and including detector means for producing voltage pulses in response to the receipt of the signal pulses, amplifier means having an input connected to the detector means and an output, feedback means connected between the input and output for varying the gain of the amplifier means in accordance with the time varying amplitude quality of the voltage pulses applied to the input for maximizing the gain for pulses of relatively short duration and minimizing the gain for pulses of relatively long duration, means connected to the output for producing a control voltage which varies substantially inversely according only to the repetition rate of pulses producing the maximum amplifier gain, trigger means responsive to the control voltage to produce an output signal when the control voltage reaches a predetermined value, and alarm means energized by the output signal.

17. Receiver means as defined in claim 16 wherein the feedback means includes a resonant circuit defining the frequency response of the amplifier means related to the width of the signal pulses.

18. In a security system, receiver means responsive to signal pulses including detector means for producing voltage pulses corresponding to signal pulses received thereby, amplifier means having an input connected to the detector means and an output, the amplifier means being responsive to rapidly varying voltage pulses for producing an amplified signal on the output thereof, a power supply, a capacitor, a charging circuit connected to the power supply for producing a control voltage across the capacitor, a discharging circuit connected between the output and the capacitor for discharging the capacitor in response to the amplified signals whereby the average value of the control signal is related to the repetition rate of the amplified signals, trigger means including a first transistor having an input electrode connected to receive the control voltage, an output electrode connected to the power supply and a common electrode, bias means connected between the power supply and the common electrode for varying the bias thereon in proportion to variations in the power supply voltage whereby the transistor is rendered conductive by a control signal corresponding to a fixed portion of the power supply voltage, and alarm means controlled by the transistor to be energized when the transistor is rendered conductive.

19. Receiver means as defined in claim 18 including an output transistor connected to the first transistor to be controlled thereby, and relay means connected between the output transistor and the alarm means for maintaining the alarm means deenergized until the first transistor conducts.

20. Receiver means as defined in claim 19 including means connected between the output and first transistors for maintaining the first transistor conductive for a predetermined time following energization of the alarm means.